United States Patent [19]

Curry

[11] Patent Number: 4,631,786

[45] Date of Patent: Dec. 30, 1986

[54] FRAME STRIP FOR RECEIVING THE EDGE OF A SHEET MATERIAL

[76] Inventor: Walter Curry, 337 Roberta Avenue, Winnipeg, Manitoba, Canada, R2K 0K5

[21] Appl. No.: 812,059

[22] Filed: Dec. 23, 1985

Related U.S. Application Data

[63] Continuation-in-part of Ser. No. 516,858, Jul. 25, 1983, abandoned.

[51] Int. Cl.$^4$ .......................... A44B 21/00; E06B 3/64
[52] U.S. Cl. ........................................ 24/460; 24/462; 160/392; 160/397
[58] Field of Search ................. 24/460, 461, 462, 459; 160/392, 395, 397

[56] References Cited

U.S. PATENT DOCUMENTS

| | | | |
|---|---|---|---|
| 1,758,720 | 5/1930 | Sodergren | 160/392 |
| 2,784,781 | 3/1957 | Rhoades | 160/397 |
| 3,225,407 | 12/1965 | Daniels | 24/462 |
| 3,803,671 | 4/1974 | Stuppy et al. | 24/460 |
| 3,805,873 | 4/1974 | Bloomfield | 24/462 |
| 3,982,306 | 9/1976 | Curry | 24/462 |
| 3,999,258 | 12/1976 | Curry | 24/462 |

Primary Examiner—Victor N. Sakran
Attorney, Agent, or Firm—Stanley G. Ade; Adrian Battison

[57] ABSTRACT

A frame strip for use in window frames or other arrangements for securing the edge of either a flexible sheet or a rigid sheet provides a strip member incorporating a cavity having two sides. One side is straight and the other side is generally parallel to the first side and incorporates a first portion and a second portion, the first portion being closer to the first side than the second portion and being interconnected by a curved section. The space between the first portion and the first side is sufficient to receive the narrow side of a rectangular locking member, the other side of which is shorter than the distance between the edge of the interconnecting portion and the bottom of the cavity and longer than the space between the second portion and the first side so that the locking member is prevented from rotation within the cavity to retain a flexible sheet wrapped therearound. A rigid sheet can also be supported by the same frame strip with the flexible sheet and locking member removed by the insertion into the cavity of a foam bead.

7 Claims, 11 Drawing Figures 4,631,786

FRAME STRIP FOR RECEIVING THE EDGE OF A SHEET MATERIAL

This application is a continuation-in-part of my U.S. application Ser. No. 516,858, filed July 25th, 1983 and now abandoned.

BACKGROUND OF THE INVENTION

This invention relates to a frame strip for receiving the edge of a sheet of material initially for use in securing the edge of a flexible or plastic sheet of transparent film but also usable in receiving the edge of a rigid sheet of transparent material such as glass or acrylic sheet.

Various forms of strip for securing the edge of a flexible sheet of transparent material have been proposed including those proposed by myself in, for example, my U.S. Pat. Nos. 3,982,306 and 3,999,258. These have been entirely satisfactory in that the flexible film is properly secured and remains taut across the space to be spanned despite the effects of wind flutter and expansion caused by temperature changes. The flexible or plastic films used can be acrylic or other plastics material or fibreglass sheeting. The films are normally used in a less expensive form of double glazing but can be used in greenhouse construction or any other area where the edge of a flexible sheet needs to be secured.

However, the above types of fixing strips have the disadvantage that a cut raw edge of the sheet or film is left exposed leaving an untidy appearance which is particularly detrimental in comparison with double glazing using rigid glass or acrylic sheet.

In addition, while various arrangements of strip have been proposed for securing different thicknesses of film or sheet, none of the proposals have allowed the flexible sheet to be replaced by a rigid sheet of glass or acrylic or for a combination of rigid and flexible sheets to be employed. Thus, at any stage if a user wishes to replace the flexible sheets by a rigid sheet arrangement, it has been necessary to totally remove and replace the securing arrangements which obviously is a costly exercise.

SUMMARY OF THE INVENTION

It is therefore a first object of this invention to provide a frame strip which can be used to secure the edge of a flexible sheet of material in such a manner that the raw edge can be tucked out of sight leaving a neat and pleasant appearance.

It is a second object of the invention to provide a frame strip which can be used to secure either a flexible sheet of material or a rigid sheet of material.

The invention therefore provides according to a first aspect, a frame strip for receiving the edge of transparent sheet comprising an elongate strip member defining therein an elongate cavity running substantially the full length of the strip member, the cavity having a constant cross section defined by a first side which comprises a substantially straight line extending from an outside surface of the strip member in a direction generally into the body of the strip member, second side comprising a first side portion extending from an outside surface of the strip member in a direction generally into the body of the strip member, a second side portion extending in the same general direction as the first side and spaced further from the first side than is the first portion, and an interconnecting portion joining the first and second portions and extending generally at right angles to the second portion, and a bottom portion interconnecting the first and second sides, wherein the length of the second side portion is greater than the distance between the second side portion and the first side and wherein the length of the first side is at least equal to that of the second side portion.

It is a further object of the invention to provide a window frame assembly in which a rigid sheet of transparent material is securely held in a simple manner and one which seals the edges of the sheet against the transmission of moisture or drafts.

The invention therefore according to a second aspect provides a window frame assembly comprising a rigid transparent sheet, four frame strips each for receiving one edge of the transparent sheet and each frame strip comprising an elongate strip member defining therein an elongate cavity running substantially the full length of the strip member, the cavity having a constant cross section defined by a first side which comprises a substantially straight line extending from an outside surface of the strip member in a direction generally into the body of the strip member, second side comprising a first side portion extending from an outside surface of the strip member in a direction generally into the body of the strip member, a second side portion extending in the same general direction as the first side and spaced further from the first side than is the first portion, and an interconnecting portion joining the first and second portions and extending generally at right angles to the second portion, and a bottom portion interconnecting the first and second sides, wherein the length of the second side portion is greater than the distance between the second side portion and the first side and wherein the length of the first side is at least equal to that of the second side portion, and four foam beads each dimensioned to extend substantially the full length of the strip member and to be compressed through the space between the first side portion and the first side so as to expand into the space between the second side portion and the first side.

It is a yet further object of the invention to provide a frame strip assembly by which the edge of a flexible sheet can be properly secured in a manner which allows a cut raw edge thereof to be secured out of sight.

The invention therefore provides according to a third aspect a frame strip assembly for securing the edge of a flexible sheet comprising an elongate strip member defining therein an elongate cavity running substantially the full length of the strip member, the cavity having a constant cross section defined by a first side which comprises a substantially straight line extending from an outside surface of the strip member in a direction generally into the body of the strip member, second side comprising a first side portion extending from an outside surface of the strip member in a direction generally into the body of the strip member, a second side portion extending in the same general direction as the first side and spaced further from the first side than is the first portion, and an interconnecting portion joining the first and second portions and extending generally at right angles to the second portion, and a bottom portion interconnecting the first and second sides, wherein the length of the second side portion is greater than the distance between the second side portion and the first side and wherein the length of the first side is at least equal to that of the second side portion, and a locking member dimensioned in a first direction so that it extends substantially the full length of the strip member, in a second direction such that it is narrower than the space between the first side and the first side portion and in a third direction such that it is shorter than the second side portion and longer than the distance between the first side and the second side portion.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Referring generally to the drawings it will be noted that each embodiment comprises a frame strip in each of which is defined a cavity of a particular and recognizeable shape. This cavity can be employed in a variety of different orientations and the remaining portions of the frame strip can differ according to the required fixing and orientation of the cavity. However, in all cases the cavity is substantially the same construction and the shape and operation of this cavity will be described in detail with reference to FIGS. 1, 2 and 3.

Figure 1:
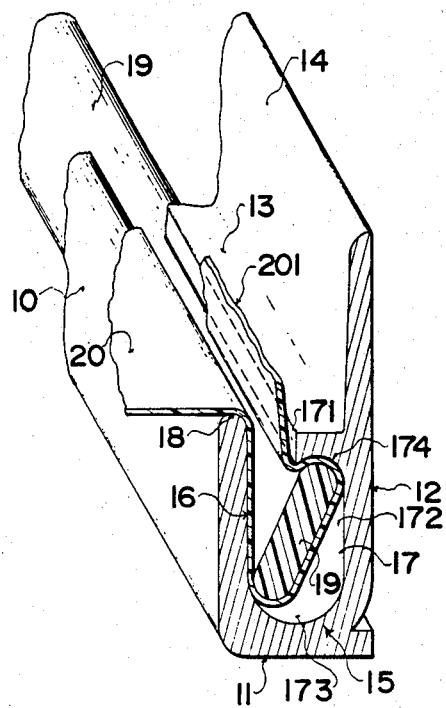
FIG. 1 is a cross sectional view through a frame strip according to the invention including a locking member whereby a flexible sheet is secured within the strip.

Referring firstly to FIG. 1, it will be noted that the frame strip comprises an elongate member of substantially rectangular outside construction having walls 10, 11, 12 and 13 with a flange 14 extending outwardly from the wall 13 and parallel to the wall 12. The flange 14 is used for fixing the strip to a surface and as shown in the other drawings, can be modified accordingly to circumstances.

A cavity opening onto the wall 13 and extending along the full length of the strip is shown generally at 15 and includes a first side 16 and a second side 17. Each of the sides extends into the body of the strip from the surface 13 in a direction generally at right angles to the surface 13. The cross section of the cavity shown in detail in the cross section of FIG. 1 is constant throughout the length of the strip. The side 16 is straight and extends from a nose 18 defined between the wall 10 and the side 16, which nose 18 extends slightly beyond the surface 13 as shown more clearly in the cross section of FIG. 2.

Figure 3:
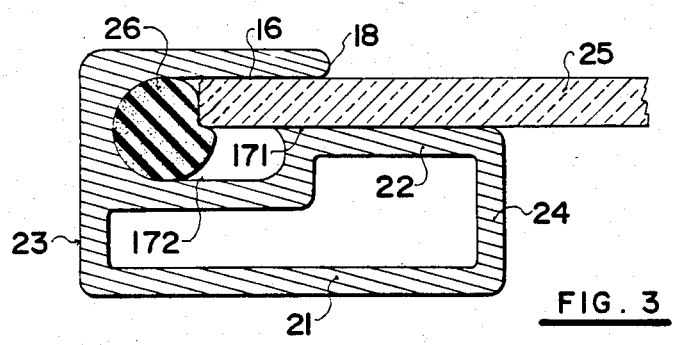
FIG. 3 is a view similar to FIG. 1 of a second embodiment of strip when used for securing a rigid sheet.

The side 17 comprises a first portion 171 which lies parallel to and spaced from the side 16 by a distance which is suitable to receive the thickness of a rigid sheet of glass or acrylic material as shown in FIG. 3. A second portion of the side 17 shown at 172 lies parallel to and spaced from the side 16 by a distance greater than the spacing between the sides 16 and 171 and in the example shown of the order of twice the distance. The side 172 is substantially straight but is connected to the side 16 and to the portion 171 by curved portions. The curved portion joining the sides 16 and 172 is shown at 173 and comprises substantially a semi-circle at the bottom between the two upstanding sides 16 and 17. The interconnecting portion between the sides 171 and 172 is also curved substantially as the radius of a circle so that the junction of the interconnecting portion 174 with the side 171 lies at a position closer to the bottom 173 than does a midpoint of the portion 173.

A separate rigid locking member 19 is shown in position in FIG. 1 but can be removed from the cavity to be separate from the frame strip of FIG. 1. The locking member 19 is elongate so as to be co-extensive with the frame side and is substantially rectangular in cross section with slight curving of the corners. A flexible sheet is shown at 20 secured in position in the cavity by the locking member 19. Thus, as shown in FIG. 1 the sheet 20 extends around the nose 18 along the surface 16 and around one end of the member 19. It then passes along one side of the member 19 and around the other end of the member 19 between the end of the member and the connecting portion 174 to emerge over the junction between the connecting portion 174 and the surface 171 to leave a free end exposed. As the sheet is under tension, it applies a turning moment to the member 19 in a clockwise direction thus forcing one corner of the member 19 into contact with the side 16 and the opposite corner of the member 19 into contact with the side 172. In this way, increased tension on the sheet 20 causes the sheet to be locked between the co-acting corners and prevents it from being withdrawn out of the cavity and around the member 19.

A space is formed between the upper surface of the member 19, and on one side, the side 16, and on the other side, the side 171. This space is sufficient to receive the free edge 201 of the sheet or film which can be tucked into the space as shown in FIG. 2 thus removing it from view and providing a tidy and clean appearance to the edge of the film.

It will be noted that the dimensions of the locking member 19 are such that in its narrower direction it is narrower than the space between the sides 16 and 171 and hence it can be inserted through that space to enter the cavity as shown. Furthermore, the longer dimension of the cross section is shorter than the longest distance between the bottom 173 and the junction between the connecting surface 174 and the side 171. In addition, it will be noted that the length of the cross section of the member 19 is greater than the distance between the sides 16 and 172 so that it is prevented from rotating within the cavity by the contact between its corners and the sides concerned. In this way, with the locking member 19 externally of the cavity and the film wrapped therearound, it can be inserted into the cavity by passing through the space between the sides 16 and 171 until one end of the member reaches the bottom 173 whereupon the other end can be passed over the nose formed at the intersection of the connecting portion 174 and the side 171 into the position as shown in FIG. 1 in which it is locked by the tension in the film 20.

This provides a secure and adequate locking of the film 20 which is sufficient to overcome changes in tension caused by wind flutter and expansion/contraction while providing a space within the cavity which is sufficient to receive a cut open edge of the sheet 201 and is dimensioned to retain that edge tucked out of sight to provide a pleasing appearance. Specifically, the surfaces of the space form a wedge shape which acts to locate the cut edge 201 in the space although it can of course be removed by specific action to do so using a tool or the fingers of an operative.

Figure 2:
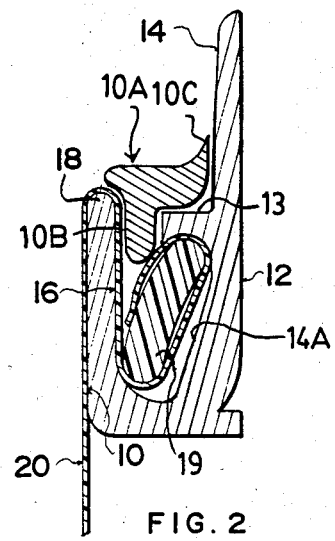
FIG. 2 is the same view as FIG. 1 incorporating a modified locking member.

Turning now to FIG. 2, the strip member shown is exactly the same as that shown in FIG. 1, the modifications concerning the orientation of the film 20 and the shape of the locking member 19. Specifically, as shown the film 20 instead of lying at right angles to the side wall 10 is turned around the nose 18 to lie parallel to the side wall 10 thus increasing the friction effect of the nose 18 on the film. It will be appreciated that the strip member of FIGS. 1 and 2 can be used in either orientation or in any intermediate orientation or even the orientation shown in FIG. 9 wherein the film emerges parallel to the side 16 without wrapping around the nose 18 at all.

The locking member 19 of FIG. 2 is modified such that the longer sides of the cross section are curved thus acting to provide increased contact between the locking member 19 and the side 16 thus improving the locking action.

It will be appreciated that the sides 16 and 172 need not be exactly flat but can have a slight curvature provided the shape is such that the locking member 19 is prevented from rotation by its contact therewith.

Turning now to FIG. 3, the same cavity shape is provided in an alternative strip member incorporating an additional wall 21 parallel to the wall 12 and to a flange 22 providing an extension of the side 171 contiguous therewith. The wall 21 is connected to the wall 12 and flange 22 by walls 23 and 24 thereby providing a hollow space within the strip member which improves insulation between the strip member and a surface adjacent the wall 21. It will be noted particularly that the side 171 and its contiguous extension on the surface of the wall 22 is flat and parallel to the flat side 16 so that they can receive in contact with their width, a flat sheet of material which may be either glass or acrylic sheet. Thus, the sheet shown at 25 is held in contact with the strip member so as to prevent lateral movement. A foam rubber bead 26 is placed within the cavity in place of the locking member 19. The foam rubber bead is of such dimension that it can be compressed and passed through the space between the side 16 and the side 171 and then expand into the space between the side 172 and the side 16. The sheet 25 is inserted into the cavity between the sides 16 and 171 of sufficiency extent to contact the bead 26 and cause some depression thereof. In this way, the sheet 25 is held against movement in either direction and drafts and moisture are prevented from passing from one side to the other both by the sides 16 and 171 and also the contact with the bead 26.

The frame strip of FIGS. 1, 2 and 3 may be manufactured of extruded rigid vinyl, aluminum or any other suitable material which can be formed into the desired rigid shapes providing hollow portions where necessary to provide the desired orientation of the cavities and to provide insulation where desired.

It will be noted from FIGS. 2 and 3 that they differ in that in FIG. 2 the nose 18 extends beyond the edge of the adjacent surface 171 but in FIG. 3 the surface 171 is extended by the surface of the wall 22 so as to extend considerably further than the nose 18. However, in both cases the nose 18 extends beyond the junction between the connecting portion 174 and the side 171 so as to substantially close the wedge shaped space defined between the locking member 19, the side 16 and the side 171.

It will be appreciated that if required, the rigid sheet 25 and bead 26 of FIG. 3 can be removed and replaced by a flexible sheet 20 and locking member 19. Also, the embodiment of FIGS. 1 and 2 can be employed with the bead 26 and rigid sheet 25 after removal of the locking member 19. Thus, the frame strip can be used interchangeably for either the rigid sheet or the flexible sheet when using the respective additional case, that is the bead 26 or the locking member 19.

Figure 4:
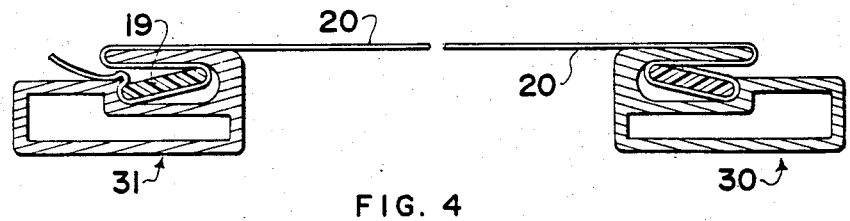
FIG. 4 is a schematic view of the strip of FIG. 3 including a second strip of similar construction when used for securing a flexible sheet.

Turning now to FIG. 4, one example is shown of use of the strip member of FIG. 3 in which a cooperating strip member of the same structure is employed, the strip members being shown at 30 and 31 respectively. A flexible sheet 20, in this case, glass fibre sheet, is stretched between the two members 30, 31 and secured in place by the respective blocking members 19. The open cut edge of the sheet adjacent the strip 30 is shown tucked into the wedge shaped space as described above whereas the open cut edge adjacent the strip 31 is shown exposed ready for being tucked in. It will be appreciated that the situation occurring in FIG. 4 has arisen because the sheet has been secured on the strip 30 prior to the securing on the strip 31 thus leaving the edge adjacent the strip 31 exposed, waiting for the final movement. The securing means for affixing the strips 30, 31 to respective surfaces are not shown in FIG. 4 for convenience of illustration.

Figure 5:
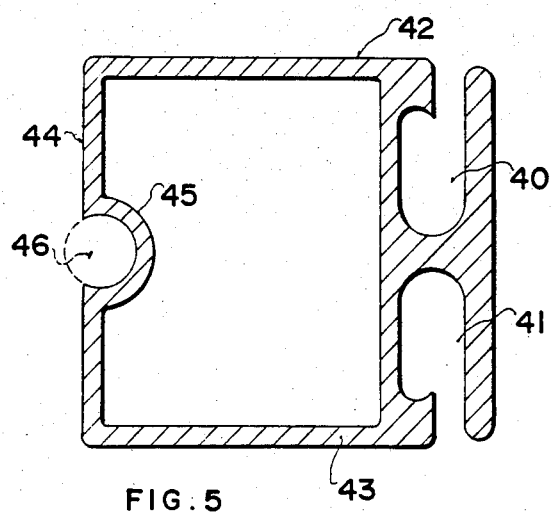
FIG. 5 is a similar cross sectional view of a further embodiment of the strip incorporating two elongate cavities and when used for securing two sheets of flexible material for forming a double glazed unit.

Turning now to FIG. 5, there is shown a further arrangement of strip incorporating two cavities indicated respectively at 40, 41. The cavities 40, 41 are arranged bottom to bottom opening on opposite surfaces 42, 43 of the strip member which is substantially rectangular in form defining within a hollow centre for insulation purposes as explained previously. The wall 44 between the surfaces 42 and 43 which is arranged for securement to a surface upon which the strip member is to be attached incorporates a part circular recess 45 for receiving a foam bead 46. The bead 46 acts to form a seal between the surface (not shown) and the wall 44 to prevent the ingress of drafts or moisture, particularly when the surface (not shown) is not entirely true.

Figure 6:
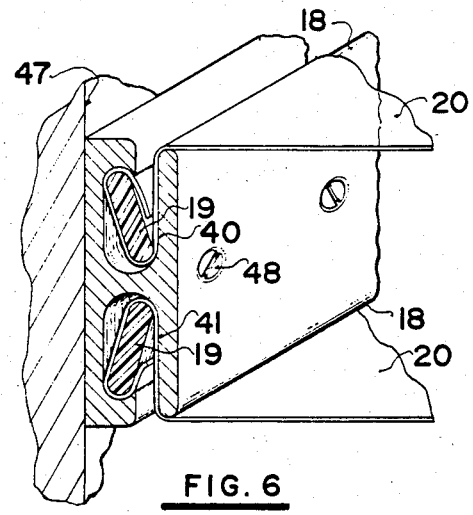
FIG. 6 is a schematic isometric view of a further embodiment of strip similar to that of FIG. 5 showing securing means for fixing the strip to a surface.

Turning now to FIG. 6, a further strip 50 is shown of similar construction to that of FIG. 5 except that the hollow section defined between the walls 42, 43 and 44 has been omitted. Thus, the wall immediately adjacent the cavities 40, 41 is attached to the surface shown at 47 by a screw schematically indicated at 48. Two films 20 are held in position as shown in detail in FIG. 1 by locking members 19 so as to extend at right angles to the strip and in parallel spaced relationship to each other. A similar strip is arranged at the other end of the films 20 (not shown) so that the films are secured at both ends in the parallel spaced relationship thus defining a double glazing arrangement employing two flexible films.

Figure 7:
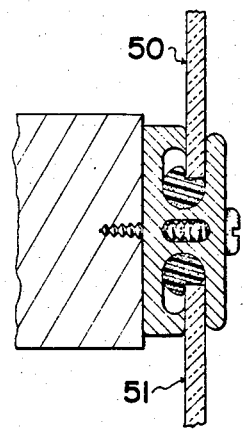
FIG. 7 is a schematic cross sectional view of the strip of FIG. 6 when used for securing both rigid sheet material and flexible sheet material.

Turning now to FIG. 7, there is shown the same structure as FIG. 6 except that the flexible films 20 and locking members 19 are replaced by rigid sheets 50, 51 and inserted into the cavities in a manner similar to that shown in FIG. 3.

Figure 8:
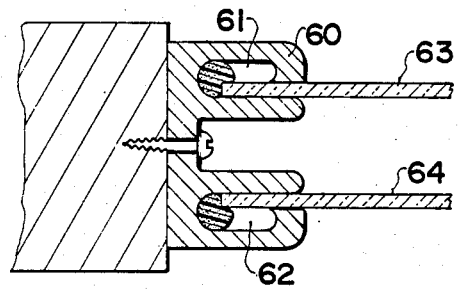
FIG. 8 is a cross sectional view of a yet further embodiment of strip mounted on a surface and used to secure rigid sheets of material in a double glazed arrangement.

Turning now to FIG. 8, there is shown a further frame strip 60 incorporating two cavities 61, 62 arranged in an orientation at right angles to the embodiment of FIGS. 5, 6 and 7. This frame strip 60 can be used to provide a double glazing arrangement of rigid sheets 63, 64 each secured in place by the arrangement shown in FIG. 3 and only schematically indicated in FIG. 8.

Figure 9:
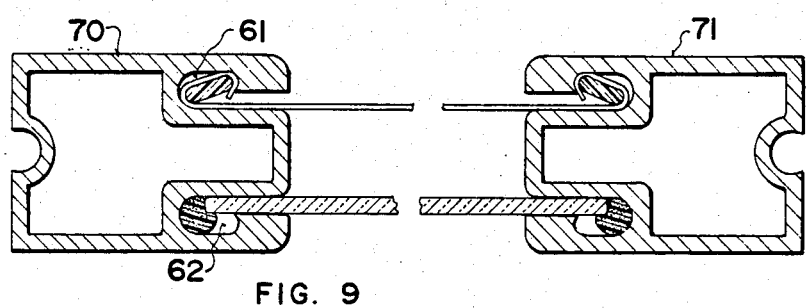
FIG. 9 is a view similar to FIG. 8 of a further embodiment of strip when used for securing a flexible sheet and a rigid sheet in a double glazed arrangement.

In FIG. 9 is illustrated further frame strips 70, 71 of substantially the same structure as that of FIG. 8 except that a hollow interior is provided for insulation purposes in a similar manner to that of FIG. 5. However, in this arrangement the cavity 62 is arranged to cooperate with a respective cavity in the strip member 71 to support a rigid sheet using the technique indicated in FIG. 3 whereas the cavity 61 is arranged to cooperate with a respective cavity in the frame member 71 to support a flexible sheet using the technique shown in FIG. 1. In this way, double glazing arrangement can be provided using one flexible sheet and one rigid sheet.

Figure 10:
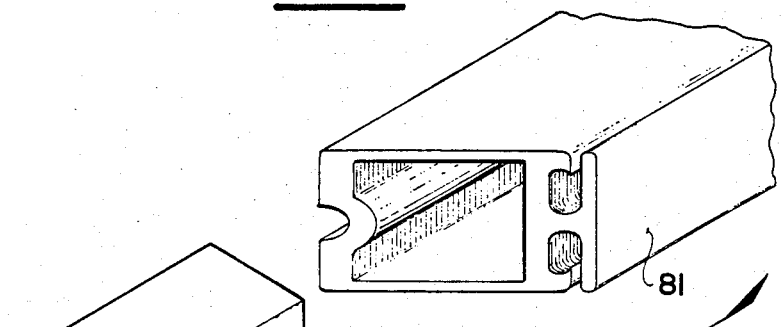
FIG. 10 is a schematic isometric view of the strip of FIG. 5 and a first embodiment of corner support.
Figure 11:
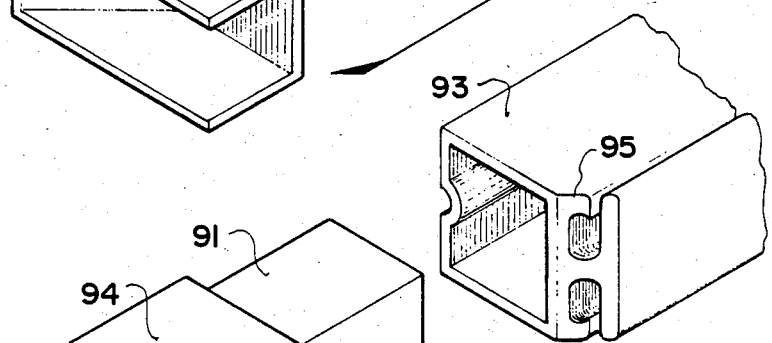
FIG. 11 is a view similar to FIG. 10 including a second embodiment of corner support.
Figure 11:
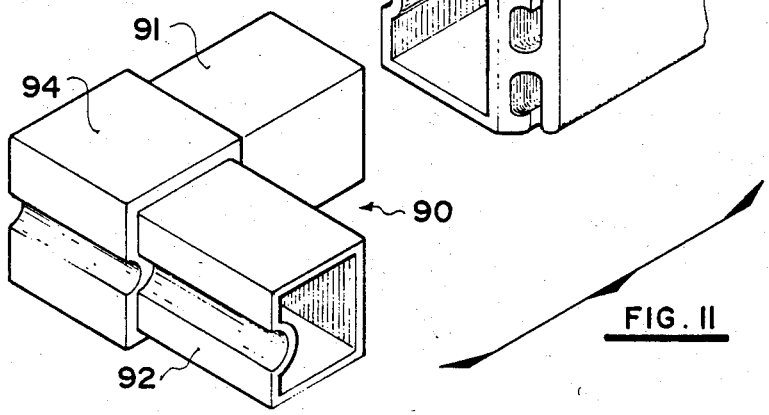

It will be appreciated that the frame strips of FIGS. 1 to 9 can be used to form a rectangular window frame supporting either the rigid sheets or the flexible sheets depending upon the wishes of the installer and bearing in mind the orientation of the cavities provided. In order to complete a rectangular window frame from the extruded frame strips, corner members are provided either of the type shown in FIG. 10 or of the type shown in FIG. 11. FIGS. 10 and 11 both employ the frame strip of FIG. 5, but it will be appreciated that corner arrangements for the other frame strips could be manufactured depending upon the shape of the particular frame strip employed. In FIG. 10, the frame strip is mitered at its end for cooperation with a similarly mitered frame strip forming the adjacent side. Thus, the corner member comprises merely an insert indicated at 80 of outside shape designed to cooperate with the interior of the respective piece of frame strip 81 and having two such portions at right angles so as to respectively enter the portions of frame strip forming the adjacent sides of the window frame to hold them at right angles. In FIG. 11, the corner member is indicated at 90 and incorporates insert portions 91, 92 for insertion into the interior of the adjacent frame strips, one of which is shown at 93. The end of the frame strip 93 is not mitered but is straight cut at right angles thereto except adjacent the cavities where a miter cut is provided. Thus, the corner member 90 includes a raised portion 94 which continues the outer surface of the frame strip 93 and the frame strip not shown which cooperates with the insert 92 and provides shoulders for butting the ends of the frame strips so as to provide a smooth joint at the corner. Each of frame strips is mitered at 95, that is at the portion defining the cavities so that the cavities of one frame strip cooperate with the cavities of the adjacent frame strip to form a continuous cavity running the full periphery of the window frame for securing the periphery of the flexible sheet (not shown).

It will be appreciated therefore that the present invention provides a construction of frame strip which can be used in various orientations and various arrangements thus providing a system of manufacturing window frames and other such frames for securing either flexible or rigid sheets of transparent material for use in various situations. The system thus provided is extremely flexible in that in many cases the plastic sheet can be removed and replaced by a rigid sheet without replacing the frame strips and the installer can choose from various types of frame strip to provide the particular construction that he requires for his particular circumstances.

Turning again to FIG. 2, it will be noted that the embodiment is modified relative to that shown in FIG. 1 in that the second side portion 17A is sloped so as to more closely follow the rear surface of the locking member 19 so as to assist in maintaining that member in the inclined position necessary for locking as shown. Furthermore there is shown a final closing piece indicated at 10A which can be inserted into the channel so as to be retained therein by a snap flange 10B. A smoothly curved nose 10C lies along side the edge 14 so as to prevent moisture and other materials encountering and entering the channel. Thus the insert piece 10A can be snapped into place as a final action in constructing the embodiment for ascetic reasons and to prevent contamination of the channel and locking recess.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A frame strip for receiving an edge of a flexible sheet of material comprising an substantially rigid elongate strip member defining therein a continuous cavity of a constant cross section defined by a first side and an opposed second side, said first and second sides being substantially rigid, said first side extending from an outside surface of the strip member, said second side having a first side portion extending from an outside surface of the strip member in a direction parallel to and alongside said first side and spaced therefrom to define therebetween a channel, a second side portion extending in the same general direction as the first side and having a spacing from the first side greater than that of the first portion, an interconnecting portion joining the first and second portions and extending generally at right angles to the second portion, and a bottom portion interconnecting the first and second sides so as to define a locking area between said bottom portion, interconnecting portion, first side and second side, wherein a dimension of the second side portion from said bottom portion to said interconnecting portion is greater than the spacing between the second side portion and the first side, and a separate rigid elongate locking member dimensioned in a thickness direction such that it is thinner than and substantially equal to a width of the channel and in a width direction such that it is less wide than the dimension of the second side portion and wider than said spacing between the first side and the second side portion whereby the thickness of the member can just pass through the channel with the flexible material wrapped therearound into said locking area without flexing the sides thereof and can lock said material by wedging of said member against said first side and against said interconnecting portion.

2. A frame strip according to claim 1 wherein the interconnecting portion is shaped so the connection thereof with the first side portion is closer to said bottom portion than a point thereof of greatest spacing from said bottom portion.

3. A frame strip according to claim 2 wherein the interconnecting portion is arcuate with said point thereof adjacent the center thereof.

4. A frame strip according to claim 1 wherein the bottom portion is curved.

5. A frame strip according to claim 1 wherein the bottom portion is substantially semi-circular and joins smoothly with the first and second sides.

6. A frame strip according to claim 1 wherein the first side terminates at a point higher than the first side portion.

7. A frame strip according to claim 1 wherein the second side portion is straight and parallel to the first side.

* * * * *